United States Patent [19]

Haddon et al.

[11] Patent Number: 5,620,553

[45] Date of Patent: Apr. 15, 1997

[54] PHOTOPOLYMERISABLE LIQUID COMPOSITIONS FOR BONDING FRICTION MATERIAL TO METAL

[75] Inventors: Margaret R. Haddon, Milton Keynes; Terence J. Smith, Hertfordshire; Stuart Mansfield, Sawston, all of England

[73] Assignee: Ciba-Geigy Corporation, Tarrytown, N.Y.

[21] Appl. No.: 443,949

[22] Filed: May 18, 1995

Related U.S. Application Data

[62] Division of Ser. No. 284,729, Aug. 2, 1994, Pat. No. 5,451,616, which is a continuation of Ser. No. 903,836, Jun. 24, 1992, abandoned.

[30] Foreign Application Priority Data

Jun. 29, 1991 [GB] United Kingdom ............... 9114099

[51] Int. Cl.⁶ ................. B32B 3/26; C09J 5/06; C09J 7/00; C09J 111/06
[52] U.S. Cl. ................. 156/273.5; 156/275.5; 156/275.7; 156/307.1; 156/307.3; 156/307.5; 156/331.1; 156/331.9; 156/332; 156/335
[58] Field of Search .................. 228/120, 903; 522/94, 105, 95, 106, 8, 16, 40, 44; 525/134; 528/87, 129, 219; 156/273.5, 275.5, 275.7, 307.1, 307.3, 307.5, 331.1, 331.9, 332, 335

[56] References Cited

U.S. PATENT DOCUMENTS

| | | | |
|---|---|---|---|
| 2,819,248 | 1/1958 | Casebolt | 260/454 |
| 3,893,225 | 7/1975 | Hamrick et al. | 228/173 |
| 4,227,978 | 10/1980 | Barton | 204/159.12 |
| 4,228,232 | 10/1980 | Rousseau | 430/271 |
| 4,250,274 | 2/1981 | Domico et al. | 525/127 |
| 4,399,239 | 8/1983 | Herwig et al. | 522/95 |
| 4,400,229 | 8/1983 | Demmer et al. | 156/307.5 |
| 4,414,275 | 11/1983 | Woods | 428/352 |
| 4,523,983 | 6/1985 | Lin | 522/106 |
| 4,552,604 | 11/1985 | Green | 156/246 |
| 4,690,987 | 9/1987 | Sakakibara et al. | 525/502 |
| 4,924,583 | 5/1990 | Hummel et al. | 29/460 |
| 5,449,704 | 9/1995 | Thompson et al. | 522/94 |

FOREIGN PATENT DOCUMENTS

| | | |
|---|---|---|
| 1267473 | 4/1990 | Canada . |
| 1575361 | 9/1980 | United Kingdom . |

OTHER PUBLICATIONS

Derwent 92-239418, Abstract of JP 4163040 Jun. 8, 1992.
Derwent 92-111514, Abstract of JP 4057879 Feb. 25, 1992.

*Primary Examiner*—Susan W. Berman
*Attorney, Agent, or Firm*—David R. Crichton

[57] ABSTRACT

A liquid composition which on exposure to actinic radiation polymerizes to form a heat-curable solid film adhesive, said composition comprising (A) a heat-curable phenol-aldehyde resol resin, (B) a photopolymerizable polyurethane or polyester having, on average, more than one polymerizable acrylic group per molecule, or a mixture of said polyurethane and said polyester, (C) a photopolymerization initiator for (B) and (D) a polyvinylacetal. The heat-curable solid film adhesive is used for bonding friction materials, such as brake linings, to metal.

20 Claims, No Drawings

PHOTOPOLYMERISABLE LIQUID COMPOSITIONS FOR BONDING FRICTION MATERIAL TO METAL

This is a divisional of Ser. No. 08/284,729, filed Aug. 2, 1994, now U.S. Pat. No. 5,451,616, which is a continuation of Ser. No. 07/903,836, filed Jun. 24, 1992, now abandoned.

This invention relates to liquid compositions which photopolymerisable to give solid heat-curable adhesives and to adhesives thereby obtained, which are particularly suitable for use in bonding friction materials such as brake linings to metal.

Phenol-aldehyde resin adhesives have often been used in the form of solid films in structural bonding applications, for example in the aerospace industry. Use of adhesives in this form eliminates difficulties which may occur when a liquid adhesive is used, such as evaporation of solvent, loss of adhesive from the required bonding area and uneven distribution of adhesive over the surfaces to be bonded.

One conventional method of producing film adhesives involves dissolving a solid resin composition in a volatile organic solvent, pouring the resulting solution onto a flat surface and then evaporating the solvent to leave a film of the resin composition. In another conventional method of making a film adhesive, a solid resin composition is heated to its melting point, extruded through a narrow slit and then cooled to form a solid film.

These conventional methods have associated disadvantages. Use of a volatile solvent usually gives rise to toxicity and/or flammability problems, while evaporation of the solvent has expensive energy requirements and solvent recovery plant has to be installed if costly wastage is to be avoided. Heating, whether for evaporation of the solvent or to melt a solid composition prior to extrusion, often results in advancement (polymerisation) of the resin, shortening the shelf life of the resulting film adhesive and leading to its premature cure.

In GB 1575361, there is proposed a method of making a phenol-aldehyde resin film adhesive which avoids the above mentioned disadvantages. In that method, a liquid composition containing a phenol-aldehyde resin and a photopolymerisable compound is photopolymerised to form an essentially solid continuous film which is still thermally curable. Amongst the many different photopolymerisable compounds suggested for use in the method of GB 1575361 are various acrylic monomers and epoxide resin-derived acrylates. The cited specification indicates that the film adhesives obtained by that method are suitable for bonding metals such as aluminium and stainless steel, glass, ceramics and wood.

There is a need for a heat-curable phenolic resin film adhesive which can be produced without the need to evaporate solvents or to use extrusion but which can meet the difficult physical property requirements of an adhesive for bonding friction materials such as brake linings to metal.

Accordingly, the present invention provides a liquid composition which on exposure to actinic radiation polymerises to form a heat-curable solid film adhesive, said composition comprising (A) a heat-curable phenol-aldehyde resol resin, (B) a photopolymerisable polyurethane or polyester having, on average, more than one polymerisable acrylic group per molecule, or a mixture of said polyurethane and said polyester, (C) a photopolymerisation initiator for (B), and (D) a polyvinylacetal.

The present invention also provides a heat-curable solid film adhesive obtained by exposing to actinic radiation a layer of a composition of the invention as hereinbefore defined.

The present invention further provides a method of bonding a surface of friction material to a metal surface which comprises bringing said surfaces together with a film adhesive of the invention as hereinbefore described between and in contact with said surfaces, and heating the resulting assembly to cure the film adhesive.

Phenol-aldehyde resols suitable for use as component (A) of the liquid composition are available commercially or may be produced by well known procedures. They are conventionally prepared by reacting a phenol, usually phenol itself, with an aldehyde, usually formaldehyde, in the presence of a base, for example an alkali metal hydroxide, aqueous ammonia or a tertiary amine such as triethylamine. Preferably (A) is a phenol-formaldehyde resol, which may have a phenol: formaldehyde molar ratio of from 1:1.2 to 1:3. Especially preferred phenol-formaldehyde resols are those having a phenol: formaldehyde molar ratio from 1:1.3 to 1:2.

The photopolymerisable polyurethane may be a reaction product of a polyisocyanate, i.e. a material having, on average, more than one isocyanate group per molecule, with a substance having at least one hydroxyl group and at least one polymerisable acrylic group. For example, it may be a reaction product of an aliphatic or cycloaliphatic diisocyanate and an adduct of an epoxide resin, such as 1,4-butanediol diglycidyl ether, with acrylic acid or methacrylic acid. Alternatively the photopolymerisable polyurethane may be a reaction product of a polyol, i.e. a material having, on average, more than one hydroxyl group per molecule, with a substance having at least one isocyanate group and at least one polymerisable acrylic group; for instance, (B) may be a reaction product of a polyoxyalkylene glycol with 2-isocyanatoethyl methacrylate.

A preferred class of photopolymerisable polyurethane is a reaction product of (I) an isocyanate-terminated polyurethane prepolymer with (II) a hydroxyl group-containing acrylic compound. Isocyanate-terminated polyurethane prepolymers are available commercially or may be obtained by well established procedures. They may be prepared, for example, by reaction of a polyol, such as a hydroxy-terminated polyether or polyester, or a polyamine, such as a polyoxyalkylene polyamine, with a stoichiometric excess of a polyisocyanate, such as an aliphatic or cycloaliphatic polyisocyanate.

A preferred isocyanate-terminated prepolymer (I) is a reaction product of a polyoxyalkylene glycol with a diisocyanate. Suitable polyoxyalkylene glycols include polyoxyethylene glycols, polyoxypropylene glycols, polyoxytetramethylene glycols, polyoxyalkylene glycols obtained by reacting diols such as 1, 4-butanediol, neopentyl glycol or 1,6-hexanediol with ethylene oxide or propylene oxide, and mixtures of two or more thereof; polyoxyethylene glycols and polyoxypropylene glycols are preferred, especially those having a molecular weight of 1000 or more.

The diisocyanate reacted with the polyoxyalkylene glycol may be an aliphatic diisocyanate such as 1,2-propylene-, 1,3-propylene,-1,2-butylene-, 1,4-butylene-, pentamethylene-, hexamethylene-, 2,4,4-trimethylhexamethylene-, 2,2, 4-trimethylhexamethylene- and dodecamethylene- diisocyanates; cycloaliphatic diisocyanates such as 1,3-cyclohexylene- and 1,4-cyclohexylene- diisocyanates, methyl-2, 4-cyclohexylenediisocyanate, methyl-2,6-cyclohexylenediisocyanate, 1,3-bis(isocyanatomethyl) cyclohexane, 1,4-bis(isocyanatomethyl) cyclohexane, 3-isocyanatomethyl-3,5,5-trimethylcyclohexylisocyanate (isophorone diisocyanate), and 4,4¹-methylenebis(cyclohexylisocyanate); and aromatic diisocyanates such as m- and p-phenylene diisocyanates, 2,4- and 2,6- tolylenediisocyanates, 1-chloro-2,4-diisocyanatobenzene, 1,4-naphthalenediisocyanate, 4,4¹-diphenylmethanediisocyanate and 4,4¹-diphenylether diisocyanate. Mixtures of two or more of the above diisocyanates can be used. Amongst these diisocyantes, cycloaliphatic diisocyanates are preferred, especially isophorone diisocyanate.

The hydroxyl-containing acrylic compound (II) is preferably a hydroxyalkyl acrylate or hydroxyalkyl methacrylate such as 2-hydroxyethyl acrylate, 2-hydroxypropyl acrylate, 3-hydroxypropyl acrylate, 4-hydroxybutyl acrylate and the corresponding methacrylates. An especially preferred compound is 2-hydroxyethyl methacrylate.

Reaction of the isocyanate-terminated prepolymer (I) with the hydroxyl-containing acrylic compound (II) to give the photopolymerisable polyurethane may be carried out using conventional procedures, for example by heating at 30°–110° C. in an inert solvent in the presence of a polymerisation inhibitor such as hydroquinone.

The photopolymerisable polyester may be a polyester modified after formation by a reaction to introduce, on average, more than one acrylic group per molecule. For example, it may be a reaction product of a hydroxyl-terminated polyester with an acrylic compound having a hydroxyl-reactive group which is a carboxyl group, a carboxylic acid halide group or an epoxide group.

Hydroxyl-terminated polyesters which may be acrylated as hereinbefore described include reaction products of dihydric alcohols with a stoichiometric deficiency of dicarboxylic acids or their anhydrides or halides. Suitable dihydric alcohols for the preparation of such polyesters include alkylene glycols such as ethylene glycol, 1,2-propylene glycol, 1,3-propylene glycol, 1,4-butanediol, neopentyl glycol, and 1,6-hexanediol; oxyalkylene glycols such as reaction products of the above mentioned alkylene glycols or dihydric phenols with ethylene oxide or propylene oxide, diethylene glycol, triethylene glycol, higher polyoxyethylene glycols, dipropylene glycol, tripropylene glycol, higher polyoxypropylene glycols and polyoxytetramethylene glycols (polytetrahydrofurans). Suitable dicarboxylic acids and anhydrides for the preparation of such polyesters include aliphatic acids and anhydrides such as succinic acid, succinic anhydride, glutaric acid, glutaric anhydride, adipic acid, pimelic acid, suberic acid, azelaic acid, sebacic acid, maleic acid, maleic anhydride and fumaric acid; cycloaliphatic acids and anhydrides such as tetrahydrophthalic acid, hexahydrophthalic acid and their anhydrides; and aromatic acids and anhydrides such as phthalic acid, phthalic anhydride, isophthalic acid and terephthalic acid.

Other hydroxyl-terminated polyesters which may be acrylated as hereinbefore described are reaction products of polyhydric alcohols or alkylene oxides with carboxyl-terminated polyesters, which carboxyl-terminated polyesters may be reaction products of dihydric alcohols such as those hereinbefore mentioned with a stoichiometric excess of dicarboxylic acids or anhydrides such as those mentioned above or reaction products of a dicarboxylic acid or anhydride such as those mentioned above with a hydroxyl-terminated polyester derived from a dihydric alcohol and dicarboxylic acid or anhydride as described above. Suitable polyhydric alcohols for reaction with a carboxyl-terminated polyester to give a hydroxyl-terminated polyester include the dihydric alcohols mentioned above and higher functional polyhydric alcohols such as trimethylolethane, 1,1,1-trimethylolpropane, pentaerythritol, dipentaerythritol, sorbitol and adducts of such higher functional alcohols with ethylene oxide or propylene oxide. Suitable alkylene oxides for reaction with carboxyl-terminated polyesters to give hydroxyl-terminated polyesters are ethylene oxide and propylene oxide.

The hydroxyl-reactive acrylic compound reacted with the hydroxyl-terminated polyester to form a photopolymerisable polyester may be acrylic acid, acryloyl chloride, methacrylic acid, methacryloyl chloride, glycidyl acrylate, glycidyl methacrylate, a reaction product of 1 mol of a hydroxyalkyl acrylate or a hydroxyalkyl methacrylate with 1 mol of a dicarboxylic acid anhydride or an acid halide of such a reaction product. Preferably, the hydroxyl-reactive acrylic compound is acrylic acid, methacrylic acid, acryloyl chloride or methacryloyl chloride.

Other photopolymerisable polyester acrylates which can be used are reaction products of a carboxyl-terminated polyester with an acrylic compound having a carboxyl-reactive group which is a hydroxyl group or an epoxide group. Suitable carboxyl-terminated polyesters include those derived from a dihydric alcohol and a stoichiometric excess of a dicarboxylic acid or anhydride as hereinbefore described. Other suitable carboxyl-terminated polyesters are reaction products of hydroxyl-terminated polyesters, such as those described above, with a polycarboxylic acid or a halide or anhydride thereof, such as the dicarboxylic acids and anhydrides mentioned above and higher functional acids and anhydrides such as trimellitic acid, pyromellitic acid, benzophenone tetracarboxylic acid and their anhydrides. The carboxyl-reactive acrylic compound which is reacted with the carboxyl-terminated polyester to form a photopolymerisable polyester acrylate may be a hydroxyalkyl acrylate or a hydroxyalkyl methacrylate, such as 2-hydroxyethyl acrylate, 2-hydroxypropyl acrylate, 3-hydroxypropyl acrylate, 4-hydroxybutyl acrylate, and the corresponding methacrylates, glycidyl acrylate or glycidyl methacrylate.

Examples of suitable photopolymerisable polyester acrylates as hereinbefore described are given in U.S. Pat. No. 4,206,025, assigned to UCB. Suitable polyester acrylates are available commercially from UCB under the trade mark Ebecryl.

Mixtures of photopolymerisable polyurethanes and photopolymerisable polyesters as hereinbefore described may be used as component (B) of compositions of the invention.

The photopolymerisation initiator (C) may be any of the known initiators for the photopolymerisation of acrylic materials. Thus (C) may be an aromatic carbonyl compound, for example a benzoin, a benzoin alkyl ether such as the isopropyl or n-butyl ether, an α-substituted acetophenone, for example a benzil ketal such as benzil dimethyl ketal, an α-haloacetophenone such as trichloromethyl p-tert. butylphenyl ketone, an α-aminoacetophenone such as dimethylaminomethyl phenyl ketone and morpholinomethyl phenyl ketone, a dialkyloxyacetophenone such as diethoxyacetophenone, or an α-hydroxy-acetophenone such as 1-hydroxycyclohexylphenyl ketone or a benzophenone such as benzophenone itself and bis(4-dimethylamino) benzophenone; a metallocene, for example a titanium metallocene such as bis(π-methylcyclopentadienyl) bis-(σ-pentafluorophenyl) titanium (IV); a Group IVA organometallic compound, for example a stannane such as trimethyl benzyl stannane, tributyl benzyl stannane or dibutyl dibenzyl stannane, together with a photoreducible dye, typically methylene blue or rose bengal; a quinone, such as anthraquinone or camphorquinone, together with an amine having hydrogen attached to an aliphatic alpha carbon atom, preferably a tertiary amine such as bis(4-dimethylamino)-benzophenone and triethanolamine; a thioxanthone, for example an alkyl- or halogen-substituted thioxanthone such as 2-isopropylthioxanthone or 2-chlorothioxanthone; an acyl phosphine oxide; or a mixture of two or more thereof. Preferably, the photopolymerisation initiator is an α-substituted acetophenone or a mixture thereof with a thioxanthone or a benzophenone. In particularly preferred embodiments, the initiator is a benzil dialkyl ketal.

The polyvinylacetal (D) may be, for example, a polyvinylformal, a polyvinylacetal or a polyvinylbutyral. Suitable such polymers are available commercially. Polyvinylbutyrals are preferred, more preferably polyvinylbutyrals having a softening point of at least 150° C., for example in the range 150°–180° C., especially those having a softening point of 200° C. or above.

The liquid composition of the invention preferably also contains at least one liquid photopolymerisable acrylic monomer as reactive diluent. Such monomers are helpful in reducing the viscosity of the liquid composition to facilitate its application to a substrate or carrier for film formation. They can also result in the film adhesive having better penetration into a friction material to be bonded, thereby increasing the depth of the bonding zone. Liquid photopolymerisable acrylic monomers are available commercially or may be prepared by well known procedures. They include hydroxyalkyl esters of acrylic acid or methacrylic acid, such as 2-hydroxyethyl acrylate, 2-hydroxypropyl acrylate, 3-hydroxypropyl acrylate, 4-hydroxybutyl acrylate and the corresponding methacrylates; esters of acrylic acid or methacrylic acid with cycloaliphatic monhydric alcohols, especially polycyclic alcohols, for example isobornyl acrylate, dicyclopentenyl acrylate and corresponding methacrylates; esters of acrylic acid or methacrylic acid with polyhydric alcohols, including dihydric alcohols such as ethylene glycol, 1,2-propylene glycol, 1,3-propylene glycol, 1,3-butanediol, 1,4-butanediol, neopentyl glycol, 1,6-hexanediol, diethylene glycol, dipropylene glycol, triethylene glycol, tripropylene glycol and dimethylolcyclohexanes; trihydric alcohols such as glycerol, 1,1,1-trimethylolpropane and trishydroxyethyl isocyanurate; and polyhydric alcohols having four or more hydroxyl groups such as erythritol or pentaerythritol. Mixtures of two or more of the above mentioned acrylic compounds can be used. Especially preferred reactive diluents are 2-hydroxyethyl methacrylate or a mixture of 2-hydroxyethyl methacrylate and dicyclopentenyl acrylate.

Other photopolymerisable acrylic materials which may be included in the composition of the invention as optional ingredients are adducts of acrylic acid or methacrylic acid with epoxide resins, which may be cycloaliphatic epoxide resins having epoxide groups attached to cycloaliphatic ring carbon atoms or, preferably, polyglycidyl ethers of polyhydric alcohols such as the alcohols hereinbefore mentioned or polyglycidyl ethers of polyhydric phenols, especially bisphenols such as bisphenol A or bisphenol F or phenolic novolak resins, and advancement products of such polyglycidyl ethers, i.e. advanced epoxide resins prepared by reacting such polyglycidyl ethers with difunctional reactants such as dihydric alcohols or dihydric phenols.

The toughness of a film adhesive of the invention may be increased, if desired, by including in the liquid composition from which the film adhesive is produced, as toughening agent, a polymer having repeating aromatic ether groups in the backbone thereof. Such polymers are available commercially or may be prepared by known procedures; they include advanced, i.e. chain-extended, diglycidyl ethers of bisphenols such as bisphenol A, preferably having an epoxide equivalent weight of at least 200, phenoxy resins, polyphenylene oxides, aromatic polyetherimide resins and aromatic polyetheretherketone resins (PEEK resins). Preferred toughening agents are bisphenol A-advanced diglycidyl ethers of bisphenol A having an epoxide equivalent weight of at least 220, especially 230 to 300, and phenoxy resins derived from bisphenol A and epichlorohydrin having a molecular weight of 80,000 to 120,000.

In the liquid composition, the weight ratio of phenolic resol (A) to the total photopolymerisable acrylic component, i.e. the acrylic-containing polyurethane and/or polyester (B) together with any other photopolymerisable acrylic material, is generally from 1:1 to 10:1, preferably from 2:1 to 5:1. The resol (A) is generally present in an amount of 60 to 90%, preferably 70 to 80%, by weight of the liquid composition. The photopolymerisable polyurethane and/or polyester (B) is generally present in an amount of 5 to 30%, preferably 10 to 25%, by weight of the resol (A). When the liquid composition contains an acrylic monomer reactive diluent, it is generally present in an amount up to 30%, preferably 5 to 20%, by weight of the resol (A). The photopolymerisation initiator (C) is usually present in the composition in conventional amounts, generally from 0.1 to 20%, preferably 1 to 10%, by weight of the total photopolymerisable acrylic component of the liquid compositions, i.e. (B) together with any other photopolymerisable acrylic material. The amount of polyvinylacetal (D) to be included in the liquid composition to give a film having suitable flexibility and tack may vary according to the nature and amounts of the resol (A), the photopolymerisable polyurethane and/or polyester (B) and any optional components. A suitable amount of (D) can be determined readily by simple experiment; generally it is present in an amount of 0.2 to 20%, preferably 0.5 to 10%, by weight of the composition. Similarly, the amount of any toughening agent to be included in the composition may be chosen to give a desired degree of toughness; generally the toughening agent is present in an amount of 0.2 to 20%, more usually 1 to 10%, by weight of the liquid composition.

Minor amounts of conventional additives can be included in the liquid composition, if desired, provided they do not prevent photopolymerisation of the composition on exposure to actinic radiation. For instance, the composition may contain an inhibitor of thermal polymerisation such as hydroquinone or 2,6-di-tert-butyl-4-methylphenol or a dye to assist in assessing film quality.

In the production of a film adhesive of the invention, the liquid composition may be applied to a release surface, such as a sheet of silicone-coated paper, a polyolefin or a nylon, or to a surface to be bonded, in a layer 10 to 250, more usually 20 to 100, micrometers thick. The layer is exposed to actinic radiation, generally of wavelength 200–600 nm, until it solidifies to form an essentially solid continuous film. The selection, from commercially available equipment, of a suitable radiation source emitting radiation within this wavelength range is a routine matter for those skilled in the art of photopolymerisation. Suitable sources include medium pressure mercury arc lamps and metal halide lamps. The exposure time required may vary according to the nature of the photopolymerisable material, the proportion of that material in the composition, the type of radiation source and its distance from the composition. Suitable times may readily be determined by those familiar with photopolymerisation techniques. It will be understood, of course, that irradiation is carried out at a temperature below that at which substantial heat-curing would occur.

When the solid film adhesive is formed on a release sheet, it may be stored on this sheet, which acts as a strippable backing sheet, until required for bonding, when the release sheet is removed before sandwiching the film adhesive between the surfaces to be bonded.

Bonding together of surfaces is effected by bringing the surfaces together with the film adhesive between and in contact with the surfaces and heating the resulting assembly to cure the adhesive. Where the film adhesive is formed on a release sheet, it may be cut to size before positioning between the surfaces. The temperatures and duration of heating required for thermal curing can readily be determined by routine experimentation and are easily derivable by those skilled in the art from what is already well known concerning the heat-curing of phenol-aldehyde resols. In general, cure temperatures from 120° C. to 180° C. can be used. Bonding may be facilitated, where desired, by heating the assembly to effect cure of the adhesive in a heated press.

The physical properties of the film adhesives of the invention render them particularly suitable for use in the bonding of friction materials such as brake linings to metals such as steel, for example in the production of brakes for the automotive and aircraft industries.

The invention is illustrated by the following Examples, in which parts are by weight unless indicated otherwise.

The photopolymerisable polyurethane used in the Examples is prepared as follows:

POLYURETHANE I

To isophorone diisocyanate (140 parts), through which nitrogen is bubbled, is added stannous octoate (0.45 part). The mixture is heated to 50° C. and Propylan D 2002, a polyoxypropylene glycol of molecular weight 2000 available from Harcros (176.5 parts) is added at 50°–55° C. over 30 minutes. Heating of the mixture at 50°–55° C. is continued for a further 3 hours. The nitrogen supply is then turned off and air is bubbled through the mixture. Hydroquinone (0.76 part) is added, followed by 2-hydroxyethyl methacrylate (144.8 parts) containing dissolved hydroquinone (1.47 parts) over 4 hours at 50°–55° C., cooling when necessary to maintain this temperature. The mixture is then heated at 50°–55° C. for a further 2 hours, by which time IR analysis indicates zero isocyanate content, before allowing it to cool to ambient temperature.

EXAMPLE 1

A liquid composition is prepared by mixing Polyurethane I (10 parts), 2-hydroxyethyl methacrylate (15 parts), dicyclopentenyl acrylate (5 parts), Mowital B 70H—a polyvinylbutyral having a softening point above 200° C. available from Hoechst (1 part), benzil dimethyl ketal (2 parts) and a liquid phenol-formaldehyde resol having a phenol: formaldehyde molar ratio of 1:1.5 and a viscosity of 30 Pa s at 40° C. (100 parts). The liquid composition is applied to a silicone—coated release paper as a layer 100 micrometers thick. This layer is irradiated using a 5000 w metal halide lamp at a distance of 75 cm for 1 minute, whereupon the layer solidifies to form a solid film adhesive.

EXAMPLE 2

A liquid composition is prepared as described in Example 1, but using α,α-dimethyl-α-N-morpholino-p-(methylthio)-acetophenone (2 parts) in place of benzil dimethyl ketal. The liquid composition is applied to a silicone-coated release paper as a layer 100 micrometers thick. This layer is irradiated using a 5000 w metal halide lamp at a distance of 75 cm for 1 minute, whereupon the layer solidifies to form a solid film adhesive.

EXAMPLE 3

A liquid composition is prepared as described in Example 1, but using a mixture of 1-hydroxycyclohexyl phenyl ketone (0.5 part), benzophenone (0.5 part) and α,α-dimethyl-α-N-morpholino-p-(methylthio)-acetophe none (1 part) in place of benzil dimethyl ketal. The liquid composition is applied to a silicone-coated release paper as a layer 100 micrometers thick. This layer is irradiated using a 5000 w metal halide lamp at a distance of 75 cm for 1 minute, whereupon the layer solidifies to form a solid film adhesive.

EXAMPLE 4

A liquid composition is prepared as described in Example 1, but using a mixture of α,α-dimethyl-α-N-morpholino-p-(methylthio)-acetopheno ne (2 parts) and 2-isopropylthioxanthone (0.7 part) in place of benzil dimethyl ketal. The liquid composition is applied to a silicone-coated release paper as a layer 100 micrometers thick. This layer is irradiated using a 5000 w metal halide lamp at a distance of 75 cm for 1 minute, whereupon the layer solidifies to form a solid film adhesive.

EXAMPLE 5

A liquid composition is prepared as described in Example 1, but using a mixture of 1-hydroxycyclohexyl phenyl ketone (1 part) and benzophenone (1 part) in place of benzil dimethyl ketal. The liquid composition is applied to a silicone-coated release paper as a layer 100 micrometers thick. This layer is irradiated using a 5000 w metal halide lamp at a distance of 75 cm for 1 minute, whereupon the layer solidifies to form a solid film adhesive.

EXAMPLE 6

A liquid composition is prepared by mixing Polyurethane I (30 parts), 2-hydroxyethyl methacrylate (45 parts), dicyclopentenyl acrylate (15 parts), Mowital B70H—a polyvinylbutyral having a softening point above 200° C. available from Hoechst (3 parts), benzil dimethyl ketal (6 parts), a bisphenol A—advanced diglycidyl ether of bisphenol A having an epoxide equivalent weight of 260 and softening at 143°–158° C. (10 parts), a red dye (0.2 part) and a liquid phenol-formaldehyde resol having a phenol: formaldehyde molar ratio of 1:1.5 and a viscosity of 30 Pa s at 40° C. (300 parts). The liquid composition is applied to a silicone-coated release paper as a layer 25 micrometers thick. This layer is irradiated using a 5000 w metal halide lamp at a distance of 75 cm for 1 minute, whereupon the layer solidifies to form a solid film adhesive.

EXAMPLE 7

A liquid composition is prepared by mixing Polyurethane I (7.54 parts), 2-hydroxyethyl methacrylate (11.29 parts), dicyclopentenyl acrylate (3.76 parts), Mowital B 70H (0.75 part), 1-hydroxycyclohexyl phenyl ketone (0.7 part), benzophenone (0.7 part) and a liquid phenol-formaldehyde resol having a phenol: formaldehyde molar ratio of 1:1.5 and a viscosity of 30 Pa s at 40° C. (75.27 parts). The liquid composition is applied to a silicone-coated release paper as a layer 100 micrometers thick. This layer is irradiated using a 5000 w metal halide lamp at a distance of 75 cm for 1 minute, whereupon the layer solidifies to form a solid film adhesive.

EXAMPLE 8

The film adhesive of Example 6 is tested as a brake bonding adhesive in a lap joint assembly formed between two mild steel sheets, with a brake pad inserted in the overlap (area 625 mm$^2$). The film adhesive is peeled off the silicone-coated paper on which it is formed, cut to size and pieces are sandwiched between the brake pad and the steel sheets. The resulting assembly is placed in a heated press at 148° C. under a pressure of 100 psi (689.5 k Pa) for 30 minutes to cure the adhesive. The lap shear strengths of the resulting joints are shown below for different brake pads, each result being an average of 6 replicates.

| | Lap Shear Strength (MPa) | |
|---|---|---|
| Brake Pad | Room Temp. | 200° C. |
| Ferodo MR 41 | 5.71 | 2.5 |
| Ferit 418 | 4.2 | 0.9 |
| Ferodo 154 | 3.0 | 1.1 |

EXAMPLE 9

The film adhesive obtained in Example 7 is tested as a brake bonding adhesive using the procedure described in Example 8. The lap shear strengths obtained are as follows:

| | Lap Shear Strength (MPa) | |
|---|---|---|
| Brake Pad | Room Temp | 200° C. |
| Ferodo MR 41 | 4.3 | 2.6 |
| Ferit 418 | 3.4 | 1.1 |
| Ferodo 154 | 2.2 | 0.6 |

EXAMPLE 10

A liquid composition is prepared by mixing Ebecryl 810—a polyester tetra-acrylate available from UCB (70.8 parts), 2-hydroxyethyl methacrylate (106 parts), dicyclopentenyl acrylate (70.8 parts), Mowital B70H (7.1 parts), benzil dimethyl ketal (20 parts), a liquid phenol-formaldehyde resol having a phenol:formaldehyde molar ratio of 1:1.5 and a viscosity of 27.6 Pa s at 40° C. (70.8 parts), a bisphenol A—advanced diglycidyl ether of bisphenol A having an epoxide equivalent weight of 260 and softening at 143°–158° C. (23.3 parts), and a red dye (0.5 part).

The liquid composition is applied to a silicone-coated release paper as a layer 36 micrometers thick. The layer is irradiated using a 5000 w metal halide lamp at a distance of 75 cm for 1 minute, whereupon the layer solidifies to form a solid film adhesive.

EXAMPLE 11

The film adhesive obtained in Example 10 is tested as a brake bonding adhesive using the procedure described in Example 8. The lap shear strengths obtained are as follows:

| Brake Pad | Lap Shear Strength (MPa) at room temperature | Lap Shear Strength (MPa) at 200° C. |
|---|---|---|
| Ferodo MR 41 | 4.67 | 1.98 |
| Ferit 418 | 4.17 | 2.18 |
| Ferodo 154 | 3.14 | 0.88 |

What is claimed is:

1. An improved method of bonding a surface of friction material to a metal surface which comprises (i) bringing said surfaces together, with a heat curable solid film adhesive between and in contact with said surfaces to form an assembly, and heating the assembly to cure the film adhesive, said film adhesive being obtained by polymerization of a liquid composition on exposure to actinic radiation, the improvement comprising using a liquid composition comprising (A) a heat-curable phenol-aldehyde resol, (B) a photopolymerisable polyurethane or polyester having, on average, more than one polymerizable acrylic group per molecule, or a mixture of said polyurethane and said polyester, (C) a photopolymerization initiator for (B), and (D) a polyvinylacetal.

2. A method according to claim 1, in which said friction material is a brake lining.

3. A method according to claim 1, in which said liquid composition is applied to at least one of said surfaces and exposed thereon to actinic radiation to form said heat-curing adhesive.

4. A method according to claim 3, in which said friction material is a brake lining.

5. A method according to claim 1, in which (A) is a phenol-formaldehyde resol.

6. A method according to claim 1, in which component (B) is a photopolymerizable polyurethane which is a reaction product of (I) an isocyanate-terminated polyurethane prepolymer with (II) a hydroxyl group-containing acrylic compound.

7. A method according to claim 6, in which the prepolymer (I) is a reaction product of a polyoxyalkylene glycol with a cycloaliphatic diisocyanate.

8. A method according to claim 6, in which the acrylic compound (II) is a hydroxyalkyl acrylate or hydroxyalkyl methacrylate.

9. A method according to claim 1, in which the photopolymerizable polyester is a reaction product of a hydroxyl-terminated polyester with an acrylic compound having a hydroxyl-reactive group which is a carboxyl group, a carboxylic acid halide group or an epoxide group.

10. A method according to claim 1, in which the photopolymerizable polyester is a reaction product of a carboxyl-terminated polyester with an acrylic compound having a hydroxyl group or an epoxide group.

11. A method according to claim 1, in which the initiator (C) is an alpha-substituted acetophenone or a mixture thereof with a thioxanthone or a benzophenone.

12. A method according to claim 1, in which the polyvinylacetal (D) is a polyvinylbutyral.

13. A method according to claim 12, in which the polyvinylbutyral has a softening point of at least 150° C.

14. A method according to claim 12, in which the polyvinylbutyral has a softening point of at least 200° C.

15. A method according to claim 1, in which the liquid composition also contains at least one liquid acrylic monomer as reactive diluent.

16. A method according to claim 1, in which the liquid composition also contains, as toughening agent, a polymer having repeating aromatic ether groups in the backbone thereof.

17. A method according to claim 1, in which the weight ratio of resol (A) to total photopolymerizable acrylate is from 1:1 to 10:1.

18. A method according to claim 1, in which the resol (A) comprises 60 to 90% by weight of the liquid composition, and the photopolymerizable polyurethane and/or polyester (B) comprises 5 to 30% by weight of the composition.

19. A method according to claim 1, which contains an acrylic monomer reactive diluent in an amount up to 30% by weight of the resol (A).

20. A method according to claim 1 in which the amount of polyvinylacetal (D) in the liquid composition is from 0.2 to 20% by weight of the composition.

* * * * *